Aug. 14, 1945.        G. W. PENNEY ET AL        2,382,253
GAS CLEANING MEANS AND METHODS
Filed Dec. 3, 1942        2 Sheets-Sheet 1
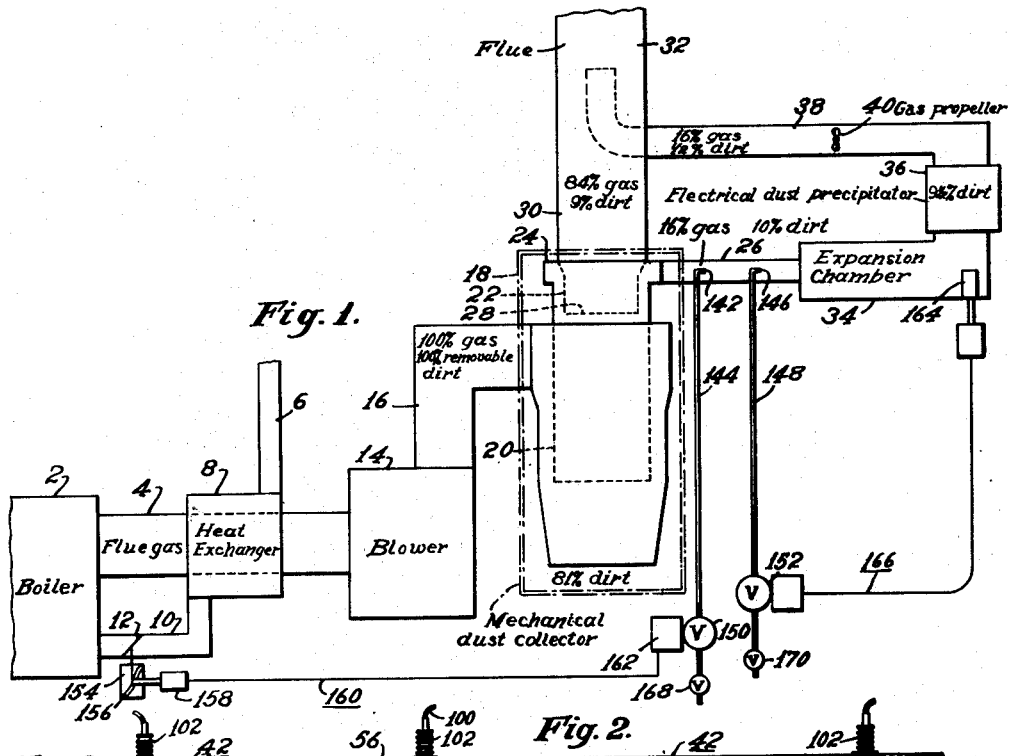
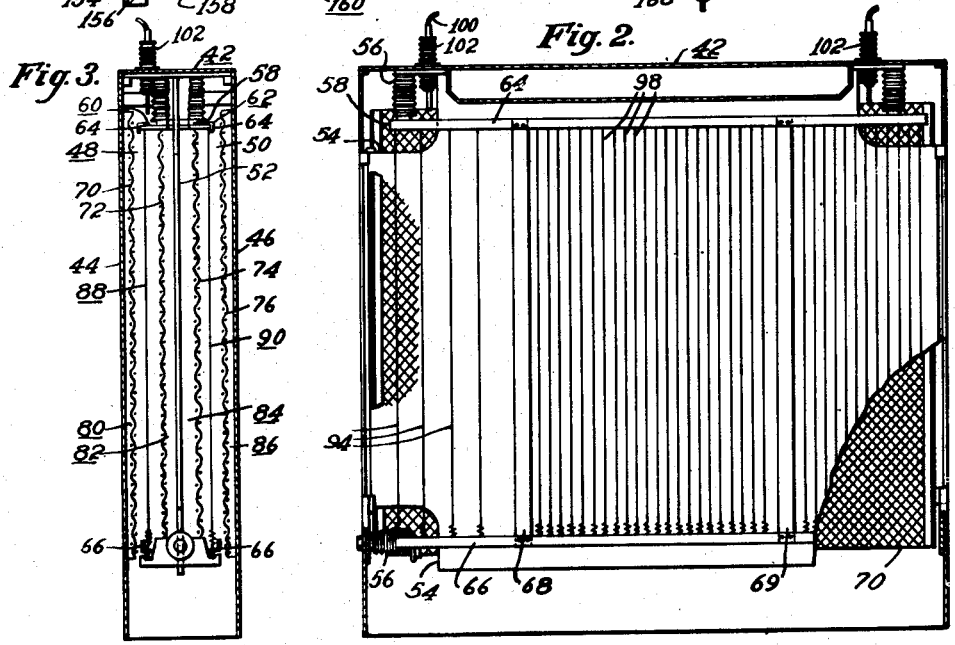
INVENTORS
Gaylord W. Penney &
Russell A. Nielsen.
BY
ATTORNEY Aug. 14, 1945.                G. W. PENNEY ET AL                2,382,253
                          GAS CLEANING MEANS AND METHODS
                          Filed Dec. 3, 1942          2 Sheets-Sheet 2
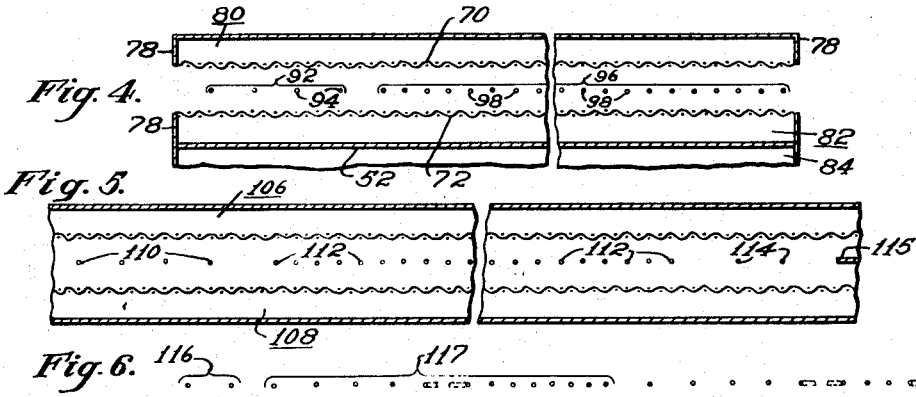
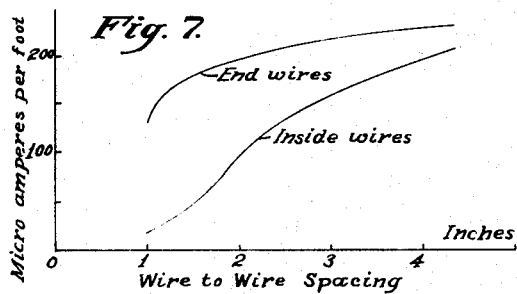
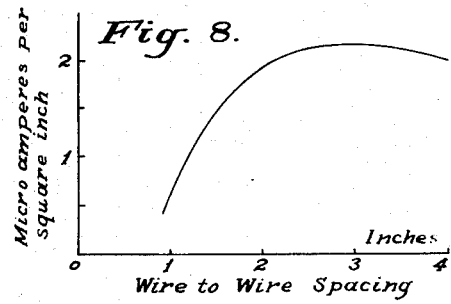
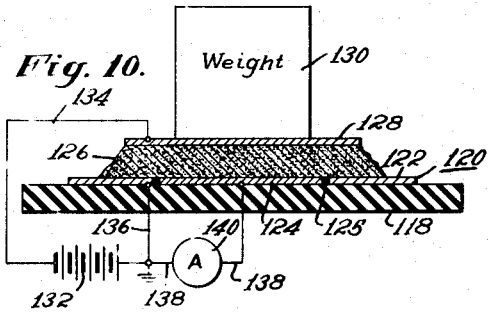
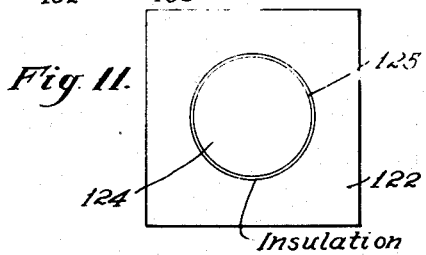
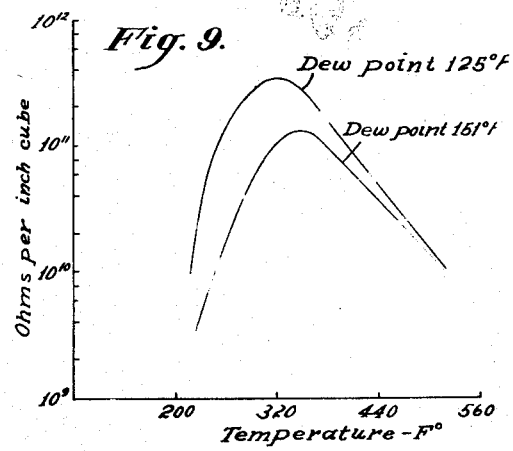
WITNESSES                                                    INVENTORS
                                                     Gaylord W. Penney &
                                                     Russell A. Nielsen
                                                          BY
                                                          A TORNEY Patented Aug. 14, 1945

2,382,253

UNITED STATES PATENT OFFICE 2,382,253

GAS-CLEANING MEANS AND METHOD

Gaylord W. Penney and Russell A. Nielsen, Wilkinsburg, Pa., assignors to Westinghouse Electric Corporation, East Pittsburgh, Pa., a corporation of Pennsylvania Application December 3, 1942, Serial No. 467,702

20 Claims. (Cl. 183—7)

Our invention relates to the removal of foreign particulate matter from flowing gases carrying such foreign particulate matter; and, more particularly, relates to practicable means and methods for cleaning dirty gases flowing in large quantities, such as for example, industrial gases or gaseous products of combustion produced in the operation of boiler houses, power plants or the equivalent.

In the art of removing such suspended foreign matter (hereinafter embracively designated as dust or dust-particles, or some similar expression for convenience, irrespective of the nature of the physical and chemical characteristics thereof), mechanical dust-collectors are, at present, considered more economical for removing relatively larger and heavier dust-particles from gases, particularly from gases having heavy dust-concentrations; while electrical dust-precipitators are usually required for removing particles of a relatively smaller or finer size; and gas-cleaning systems are known in which a dust-carrying gas is first treated by a mechanical dust-collector and then by an electrical dust-precipitator so that the gas can be more thoroughly cleaned without undue cost.

There is no clear line of particle-size on one side of which it would be more desirable to use mechanical dust-collectors, and on the other side of which it would be more desirable to use electrical dust-precipitators. The design of the mechanical dust-collector may have a material influence on its dust-collecting capabilities, but generally practical mechanical dust-collectors do not remove with satisfactory efficiency the very fine dust-particles of about 10 to 20 microns and less. Electrical dust-precipitators, on the other hand, can remove gas-borne dust-particles substantially without limitation as to size, and practicable gas-cleaning electrical dust-precipitators can be had which can readily remove such small particles as tobacco-smoke particles which run about .1 micron. Electrical dust-precipitators frequently operate at efficiencies of 85% to 95% for most commercial purposes, although the efficiencies can be made even higher.

A mechanical dust-collector is known in which the relatively larger dust-particles are first removed from a gas which then continues to flow with rotational whirling motion-components tending to force dust-particles remaining in the gas, which have not been removed by the mechanical dust-collector, outwardly. By "skimming off" or separating an outer dust-laden gas-layer and passing it through an electrical dust-precipitator, fine dust-particles which normally escape the mechanical dust-collector can be removed with high efficiency. The remainder of the flowing gas which is not sent through the electrical dust-precipitator has a high degree of cleanliness so that it need not be further cleaned.

This combination of a mechanical dust-collector, which treats substantially all of the gas, and an electrical dust-precipitator, which treats a small portion of the gas in which the fine dust-particles had been concentrated, has the advantage of being able to clean the gas more thoroughly than the mechanical dust-collector could alone, and at a cleaning efficiency approaching the order of that obtainable by the use of electrical dust-precipitating means alone. Such a combination has the further advantage of being attractively less costly and requiring less equipment for its degree of cleaning.

In a system of this type, the relative proportions of the amount of skimmed-off gas-flow to the amount of total gas-flow can be controlled or chosen as desired and may depend on the operation of the mechanical dust-collector; but in the cleaning of products of combustion or flue-gas resulting from the burning of pulverized coal, skimming off about 15%, more or less, of the gas for treatment by the electrical dust-precipitator has been found satisfactory for producing an adequate overall gas-cleaning.

It is an object of our invention broadly to provide an improved gas-cleaning system of the type described, comprising a skimmer mechanical dust-collector, and an electrical dust-precipitator for the skimmed-off gas; and, more particularly, to provide an improved gas-cleaning system which is especially useful for the cleaning of flue-gases resulting from the combustion of powdered or pulverized bituminous coal, but our invention is not limited to cleaning such gases, but is generally useful for cleaning dust-carrying gases flowing in a large quantity.

We have discovered that such continuous electrical cleaning of the skimmed gas is best accomplished when the temperature or humidity, or both, of the gas is such that the resistivity of the precipitated fine dust-particles is controlled so as to reduce any adverse effect they may cause after precipitation, mostly through the phenomenon known as back-ionization. In particular, we have found that for a given humidity of the dust-carrying gas, the precipitated fine dust-particles or ash, which originate from the burning of pulverized coal, have a maximum resistivity, as a mass, through a temperature range; the resistivity being lowered above and below such range. The resistivity for a given temperature is also lower at higher dew points. By controlling the humidity or temperature, or both, of the gas being electrically cleaned, so that the conditions are such that the aforesaid resistivity of the fine dust-particles is generally outside the aforesaid maximum resistivity range, satisfactory operating conditions result in which back-ionization with its detrimental effect on dust-precipitation is reduced or avoided. According to a preferred embodiment of our invention, the gas conditions are controlled by introducing $H_2O$, either as steam or as a water spray, into the gas just before it enters the electrical dust-precipitator. However, any other means may be employed through which the resistivity of the dust-particles is made to be of a value for effective precipitator operation.

Inasmuch as flue-gases of the type more specifically mentioned frequently contain relatively large amounts of products which become corrosive at high humidities, the humidity of the gas should not be increased beyond the point at which liquid will condense out of the flue-gas being cleaned, particularly when such flue-gas is passing through a relatively high and cool smokestack. In our invention, by recombining the cooled smaller portion of the flue-gas which has been electrically cleaned with the hot larger portion which has been treated in the mechanical dust-collector, before or at the lower part of the smokestack, the temperature of the cooled gas-portion is increased, while the overall dew point of the total gas-stream is not appreciably affected so that there is little likelihood of added corrosive action in the smokestack.

According to our invention, the amount of $H_2O$ which is sprayed into the gas-portion to be electrically cleaned is varied in some manner or manners dependent on the amount of fuel being burned, this being a measure of the flue-gas produced. In general, as the amount of fuel combusted is decreased, the amount of spray-water should be decreased in greater relative proportions since a decrease in the combustion rate of the fuel not only reduces the volume of the flue-gas produced, but may discharge it at a lower temperature.

A further object of our invention lies in the provision of an electrical dust-precipitator having novel gas-cleaning means comprising receiving electrode-means and ionizing electrode-means, which is especially useful in a dust-removing system of the type described for continuously removing the fine dust-particles concentrated in the skimmed-off flue-gas. The electrical dust-precipitator, per se, forms the subject matter of our divisional patent application Serial No. 569,192, filed December 21, 1944, in which it is described in greater detail.

It is amongst the many objects of our invention to provide a system and method for cleaning flue-gases in accordance with the features hereinbefore described, and other objects, innovations, details, combinations, and methods of our invention may be discernible from the following description thereof which is to be taken in connection with the accompanying somewhat diagrammatic drawings. The drawings are not to scale and minor and known details have been omitted in the interests of clarity. In the drawings:

Figure 1 is an outline view diagrammatically showing a complete gas-cleaning system for cleaning gases having heavy dust-concentrations;

Fig. 2 is a vertical sectional view longitudinally through a preferred electrical dust-precipitator utilized in the system of Fig. 1;

Figs. 3 and 4 are, respectively, a transverse vertical sectional view and a horizontal sectional view of the electrical dust-precipitator of Fig. 2;

Figs. 5 and 6 are partial schematic horizontal sectional views showing modified arrangements of ionizing-wires in an electrical dust-precipitator;

Figs. 7 and 8 are curves, respectively indicating the effect of spacing of a plurality of spaced ionizing-wires on their discharge current and on the current received by associated receiving electrode-means;

Fig. 9 is a curve for representing the resistivity of the fine dust-particles, as a mass, which are precipitated in a system of the type described;

Fig. 10 is a vertical sectional view of an apparatus for measuring resistivity of dust-particles, and Fig. 11 is a plan view, on another scale, of an electrode-means of such measuring apparatus.

Our invention is generally applicable with any suitable equipment which discharges a dust-laden gas that is to be cleaned. However, in showing a preferred form of our invention, it is applied to an equipment which discharges dust-laden gaseous products of combustion or flue-gas, such as any suitable boiler 2 having an outlet 4 for the flue-gas resulting from the burning, in the boiler, of coal with the aid of combustion air supplied through an air supply conduit means 6. The combination air flowing through the conduit means 6 and the flue-gas flowing through the outlet 4 may be passed through a heat-exchanger or economizer 8 for preheating combustion air and for cooling the flue-gas. In general practice, the heat-exchanger, or other heat-economizing means, lowers the temperature of the flue-gas to temperature values which may average between 300 and 400° F., although there is no fixed standard so that the temperatures of the gas may be more or less. However, the gas-temperatures are sufficiently above the boiling point of water to discourage liquid condensation in the smokestack through which the gas may be ultimately discharged into the atmosphere. The combustion air leaving the heat-exchanger 8 passes to an air-feed pipe 10 which supplies the air to the fuel-burning equipment in the boiler. An adjustable valve 12, shown schematically as a vane in the air-feed pipe 10, controls the rate of supply of air for combustion.

In the particular embodiment shown, flue-gas leaving the heat-exchanger 8 passes to a draft-inducting blower 14, the discharge end of which is connected by a conduit section 16 to a mechanical dust-collector 18 represented diagrammatically within the rectangle comprising the double dash-dot lines shown in Fig. 1.

The heavier dust-particles are removed from the flue-gas by the mechanical dust-collector, and the gas may then be treated to concentrate unremoved fine dust-particles in a separable portion thereof, but preferably the mechanical dust-collector 18 is of a type which carries out both such steps of separating whatever dust-particles it can from the flue-gas, and causing the gas, after such dust-particles have been or are being removed, to revolve so as to centrifugally act upon the dust-particles which have not been removed and cause them to concentrate in an outer portion or layer of the rotating gas. In the mechanical dust-collector schematically shown in Fig. 1, incoming gas is caused to rotate about a tubular member 20 while flowing generally downward. It is then caused to reverse and flow upwardly within the tubular member 20 while continuing its transverse whirling motion. In such flow-passage, the heavier dust-particles separate from the gas and fall to the bottom of the mechanical dust-collector into any suitable dirt-receiving or hopper means. By the time gas reaches the inlet end of a short openended cylinder-like baffle-member or skimmer 22, inside the far or upstream end of the member 20, the relatively larger and heavier dust-particles are removed which are within the cleaning limitations of the mechanical dust-collector, and relatively fine dust-particles concentrated in an outer whirling layer of the gas.

The skimmer 22 is of lesser diameter than the inside diameter of the member 20 and functions as a baffle for skimming off or directing the outer layer of gas laden with fine dust-particles, into a gas-collector header 24 having an outlet pipe 26. The baffle-member 22 has a downstream edge 28 and has its upstream edge peripherally closed against the header 24. The remaining or main portion of the flue-gas flowing inside the skimmer 22 passes through a conduit section 30 which leads to the lower part of any suitable smokestack, flue or chimney 32. If desired, a draft-inducing means may be utilized on the downstream side of the main discharge outlet of the mechanical dust-collector, for example in the conduit section 30, instead of before the mechanical dust-collector, as shown.

The skimmed-off dust-laden gas-portion collected in the header 24 passes through the outlet pipe 26 into an expansion chamber 34 and then to an electrical dust-precipitator 36 where this gas portion is electrostatically cleaned. After such cleaning, this gas-portion is conveyed to the bottom of the smokestack 32 through a conduit section 38. The expansion chamber 34 is desirable in commercial installations where the velocity of outflowing flue-gases may be very high, in the order of 2000 f. p. m. and above. Such a gas velocity is considered too high for passage through an electrical dust-precipitator, so that the expansion chamber 34 is provided for decreasing the gas velocity to a value which the electrical dust-precipitator 36 can handle efficiently. A blower means, schematically indicated as a fan-propeller 40 in the conduit section 38, may aid flow of gas through the electrical dust-precipitator.

In the bottom portion of the smokestack, the electrically cleaned gas-portion recombines and mixes with a main portion of the flue-gas which has not been by-passed through the electrical dust-precipitator. The recombined gas-portions flow through the smokestack and discharge therefrom into the general atmosphere or may be otherwise treated.

In operation of a particular system such as described, the adjustable valve 12 was positioned in accordance with the rate at which fuel was being burned in the boiler 2. The flue-gas produced by the burning of the fuel passed through the equivalent of outlet 4, the heat-exchanger 8, and the draft-inducing blower 14 and the conduit section 16.

The gas leaving the conduit section 16 in the system shown, about to enter the dust-removing equipment comprising the mechanical dust-collector 18 and the electrical dust-precipitator 36, permits this location to be considered a reference point for a comparison of gas characteristics. Consequently, the fuel-gas in the conduit section 16 can be said, for comparative purposes, to consist of a total of 100% gas containing a total of 100% of the gas-borne dirt.

In passing through the mechanical dust-collector 18, the relatively heavier dust-particles were removed from the flue-gas and the relatively fine dust-particles concentrated in the outer layer of the whirling gas at the expense of the inner layer flowing within the skimmer 22. In an actual embodiment of a system of the type described, the mechanical dust-collector, which was highly efficient for a device of this kind, removed about 81% of the total reference dirt, and concentrated about 10% of the total reference dirt in 16% of the total reference flue-gas, which 16% was skimmed off into the header 24. The remaining 84% of the total gas was discharged from the mechanical dust-collector into the smokestack 32 and carried about 9% of the total dirt. The 16% skimmed-off gas-portion had about 95% of its dirt removed in the electrical dust-precipitator which, therefore, collected about 9½% of the total reference dirt in the total flue-gas. About ½% of the total dirt is the gas-portion flowing in the conduit section 38. These data are, of course, illustrative and not recited as limitations to our invention.

Since the mechanical dust-collector cleans the gas with a useful efficiency, the system described has a further advantage of permitting the gas-flow through the electrical dust-precipitator to be shut-down temporarily for servicing of the precipitator, without interrupting the operation of the plant 2.

The dust or dirt which was precipitated in the electrical dust-precipitator was ascertained by elutriation to be composed of particles in the following size ranges and weight percentages:

| Size in microns | Percent weights |
| --- | --- |
| 0–7.5 | 45.7 |
| 7.5–10 | 29.2 |
| 10–15 | 20.3 |
| 15–20 | 4.6 |
| Greater than 20 | Trace |

These values are not to be deemed limitations, since with a less efficient mechanical dust-collector or under different conditions or with different gases or different dirt, the particle sizes in the gas skimmed off might be considerably different and the percentage weight distribution considerably different.

For continuously electrically precipitating such fine dust-particles, as recited above, we have found it desirable, because of the nature of the dust carried in the skimmed gas-portion, to provide a special novel electrical dust-precipitator and to control the resistivity of these fine dust-particles before being subjected to electrical cleaning action.

In accordance with this aspect of our invention, an electrical dust-precipitator is provided in which the intensity of discharge of the ionizing electrode-means to the receiving electrode-means is varied, in some manner or manners, along the direction of gas-flow, for more effective precipitation of the fine dust-particles in the skimmed flue-gas. We have found it desirable to provide a relatively short intense ionizing field on the upstream side of the electrical dust-precipitator and a subsequent downstream relatively long dust-precipitating field which is, preferably, slightly ionizing.

A form of such an electrical dust-precipitator is shown in Figs. 2, 3 and 4, and comprises an upright metallic rectangular prismatic casing 42 having an open bottom and open ends. The casing comprises large upright continuous parallel opposite sides 44 and 46 extending longitudinally in the direction of gas-flow.

The casing is divided into two separate parallel and similar gas-cleaning compartments 48 and 50 by a central upright metal plate or partition 52 extending substantially from one open end of the casing to the other, and having a height substantially that of the inside of the casing. Corners of the plate 52 are cut away, as indicated at 54, to provide air-insulation about a plurality of corner insulators 56 and parts of an insulated open metal framework 58 supported by the insulators. A dust-precipitator having two adjacent gas-cleaning compartments is hereing shown for simplicity, but in actual practice many more similar gas-cleaning compartments may be provided.

The framework 58 comprises flat supporting frame-sections 60 and 62, connected at their corners for supporting ionizing electrode-means substantially centrally in each of the gas-cleaning compartments 48 and 50, respectively. Each frame-section comprises spaced longitudinal upper and lower angle or channel bars 64 and 66, respectively, bridged by transverse braces 68 and 69, for supporting the associated ionizing electrode means which comprise, in this instance, ionizing wires vertically strung in spaced relation substantially in a plane parallel to the plate 52 and the casing sides 44 or 46.

Non-discharging receiving electrode-means are disposed on each side of each of said ionizing electrode-means in each of the gas-cleaning compartments, each receiving electrode-means comprising a front of a foraminous grid-like conducting material, spaced a suitable distance from an associated plate or casing side. The foraminous electrodes may comprise a plurality of spaced grid-bars, expanded metal, wire-mesh, or the equivalent. Wire screen, which we have shown, has been found satisfactory. Screens 70 and 72 in the gas-cleaning compartment 48 are respectively associated with and parallel to casing side 44 and one side of the plate 52; and screens 76 and 74 in the gas-cleaning compartment 50 are respectively associated with and parallel to casing side 46 and the other side of plate 52. Metal securing bars 78 may be used to connect or bridge edges of each foraminous electrode and its associated plate or side to provide a supporting structure for the screens and to bar gas-flow in the direction of the gas-stream between each screen and its associated plate. However, the bottom is left open to permit precipitated dirt to fall therethrough. Thus each receiving electrode-means comprises an open-bottom cage structure somewhat resembling a Faraday cage. Suitable baffles may be provided at the top and bottom of the electrical dust-precipitator to bar gas-flow through the air-insulation spaces below and above the ionizing electrode-means.

For convenience, the receiving electrode-means comprising, respectively, the foraminous electrodes 70, 72, 74 and 76 are designated, respectively, by the reference numerals 80, 82, 84 and 86; and the ionizing electrode-means comprising the frame section 60 in the compartment 48 and associated ionizing wires, and the ionizing electrode-means comprising the frame section 62 and the associated ionizing wires in the gas-cleaning compartment 50, are respectively designated by the reference numerals 88 and 90.

The ionizing electrode-means in each gas-cleaning compartment is substantially alike in the preferred embodiment being described, and comprises a plurality of longitudinally spaced ionizing wires.

The foraminous front of each electrode-means is preferably sufficiently close to the associated back-plate, and is provided with openings sufficiently large to cause a few of the field-lines to pass therethrough and terminate on such backplate rather than on the metal of the foraminous front, so that a weak electrostatic field is provided within the cage structure.

A suitable expedient is used for obtaining different ionizing intensities longitudinally in the electrical dust-precipitator, but we have found that the spacing between successive or adjacent ionizing-wires can be changed within limits to control the discharge from them.

The effect of spacing upon discharge current is indicated in Figs. 7 and 8 which were obtained from a set of five 30 mil wires having an effective length of about 3 feet, and negatively energized by a 25,000 D. C. volt source, with respect to plate receiving-electrodes about 2" from the plane of the set of the wires. The curves were generally the same with screen receiving-electrodes. As shown in Fig. 7, as the spacing between adjacent wires decreases the discharge current in microamperes per foot of wire decreases, until below one inch spacing the discharge current from the inside wires is very weak, and the wires collectively approach the action of a solid continuous flat precipitating plate-electrode of the type used in, for example, the precipitating zone in G. W. Penney Patent No. 2,129,783 of September 13, 1938. This decrease in discharge current with decreased spacing can be attributed to the influence of successive or adjacent wires on each other, which distorts and weakens the field gradient at their facing sides, and more and more on their sides toward the receiving plate-electrodes as the ionizing-wires are brought closer together.

The fields of the two end or external ionizing-wires, however, are affected primarily on one side only, so that the discharge current from these wires is somewhat greater, but a sharp decrease is noted when the spacing gets sufficiently close. Significant discharge from an end wire can be avoided by using very close spacing. For given conditions, the size of a wire also affects its discharge current, the discharge decreasing as the radius of curvature comes greater or the curvature becomes less, so that an increased size of wire can be used for reducing discharge current. As is known, the distance of the receiving electrode-means also influences the discharge current.

The ionizing-wires of the ionizing electrode-means 88 comprise an upstream group or grid 92 of relatively few ionizing-wires 94 near the gas-inlet of the gas-cleaning compartment 48, these wires being relatively widely spaced so that any one wire does not have any appreciable field-disturbing effect on the adjacent wires of the group. The ionizing electrode-means 88 further comprises a more extended downstream group or grid 96 of relatively numerous ionizing-wires 98. The ionizing-wires 98 are spaced in closer relation than the ionizing-wires 94, in order to cause a wire 98 to have a field-disturbing influence on adjacent wires of the same group, thereby lowering the discharge or ionizing current. By field-disturbing influence or effect, we mean the lowering of the field-gradient at the surface of a wire by the proximity of another wire or surface having the same potential-polarity and a potential approximating that of the first wire.

In an embodiment of our invention utilizing a potential of 25 kv. direct-current having its negative terminal connected to the framework 58 through a conductor 100 passing through an insulating bushing 102, and having its other positive terminal connected either conductively or through ground to the receiving electrode-means 80 and 82, four 30-mil ionizing-wires 94 about 54 inches long produced an average discharge current of about 200 microamperes per foot of wire, while 24 similar 30-mil ionizing-wires 98 spaced about 1 inch apart in a gas-flow direction and transversely spaced from the one inch mesh screening receiving electrode-means 80 and 82 the same distance as the wires 94 produced a discharge current of about 20 microamperes per foot of wire. The last downstream ionizing-wire 94 was about 5½ inches from the first upstream wire 98. In such a precipitator, approximately 60% of the dust-particles in the gas flowing along each successive foot of the gas-cleaning means, was precipitated. That is, 60% of the dust in the gas was precipitated in the first foot of length, 60% of the remainder in the next foot and so on.

The very fine dust-particles, previously described, contained in the flue-gas, can be efficiently precipitated in an electrical dust-precipitator of a type comprising the various electrode-means more particularly described heretofore, the dust or dirt entering the cage-structure of the receiving electrode-means and falling down through the open bottom thereof so that the precipitated dirt can be collected in any suitable manner.

The more intense ionization produced by the ionizing-wires 94 at the front of the gas-cleaning means causes an adequate charging of the fine dust-particles in the gas flowing therethrough, while the downstream electrostatic field between the ionizing-wires 98 and the cooperating receiving electrode-means 48 and 50 functions primarily as a precipitating field of extended length for the major portion of the dust-particles. The weak ionization in this dust-precipitating field also has the advantages of augmenting the charging of gas-borne fine dust-particles while at the same time providing a suitable precipitating field, and of charging and precipitating dust lumps or agglomerates chunked or blown off the foraminous electrode-front.

Variable spacing between ionizing-wires can be utilized to improve dust-precipitation by making the current collected by the receiving electrode-means different along its gas-flow length to correspond, in some degree, to the character of the dirt sticking to the front of the receiving electrode-means, so as to permit operation of the electrical dust-precipitator with back-ionization minimized.

A modified form of ionizing electrode-means is shown in Fig. 5. In this embodiment, spaced non-discharging receiving electrode-means 106 and 108 are provided which may be flat plates or cage-structures, as in the previous embodiment, or any other suitable form. Associated with these receiving electrode-means on the entrance or upstream side thereof is an ionizing electrode-means comprising relatively widely spaced ionizing-wires 110 having a relatively intense discharging current mainly for charging the gas borne dust-particles. On the downstream side of the ionizing-wires 110 and sufficiently away therefrom so as not to exert an objectionable field-disturbing influence thereon, the ionizing electrode-means comprises a group of relatively closely spaced ionizing-wires 112 providing a dust-precipitated field of relatively extended length in the gas-flow direction, the wires being sufficiently numerous and sufficiently closely spaced to exert an appreciable field-disturbing influence on each other. Still further on the downstream side of the wires 112, the ionizing-electrode-means comprises one or more ionizing wires 114 spaced to provide a more intense discharging current than the wires 112, as a clean-up for recharging and precipitating dust-particles still carried with the gas after leaving the main dust-precipitating field of the wires 112. If desired, a precipitating plate 115 may be added on the downstream side, insulated from and charged oppositely with respect to the receiving electrode-means.

In Fig. 6, the ionizing electrode-means comprises a few intensively discharging wires 116 at the upstream end followed by a plurality of wires 117 having spacing between adjacent ones which progressively becomes smaller in the downstream direction for gradually decreasing the intensity of discharge current. As many sets of ionizing wires having first an intense discharge and then a gradually weaker discharge may be arranged successively in a gas-flow direction, as desired, two such sets being shown in Fig. 6. In Fig. 6 the broken line between two wires is indicative of a span including additional wires properly spaced gradually decreasing distances.

Gas-borne dust-particles resulting from the burning of pulverized bituminous coal are collectively generally designated "fly ash"; but in the system herein described, the dust which was electrostatically removed differed not only in size but also in overall chemical and physical characteristics from the dust which was mechanically removed. Moreover, the dust precipitated in the preferred electrical dust-precipitator was different along the gas-flow length, the change, however, being gradual, starting with coarser particles containing more carbon at the front and finer particles with increased resistivity at the rear.

Received current in microamperes per square inch of receiving electrode-means varies with ionizing-wire spacing; and Fig. 8 shows how the average received current decreases very materially with spacings below about 2 inches in a device as described in connection with Fig. 7. Between 2 inch and some about 4 inch spacing the received current is fairly constant but with slowly decreasing value as the spacing increases.

Back-ionization can be reduced or eliminated by sufficiently reducing the voltage drop across a precipitated coating in any manner, or by decreasing the current received by the receiving electrode-means on which high resistance material collects. For illustration, let it be assumed that the resistivity of the dirt collected at the upstream end of an electrical dust-precipitator is R, at the center 3R, and at the downstream end 10R. If the precipitator has uniformly spaced ionizing-electrodes which can be charged to 25 k. v., on the downstream end before back-ionization occurs, it may be able to hold a greater voltage at the center and a still greater voltage at the upstream end without objectionable back-ionization. The increased voltages at the center and upstream end would give an increase in discharge current and, therefore, in dust-precipitating efficiency, or a higher voltage may be used throughout if the resistivity at the downstream end were decreased to say, 3R. Such an improvement can frequently be obtained by temperature or humidity control or both of the gas. A similar effect can be obtained by the varied spacing between the ionizing-wires. By suitably spacing the wires for relatively lower current received by the receiving electrode-means where the higher resistivity dust coats them, back-ionization thereat may be reduced or eliminated.

The resistivity of fine dust-particles is customarily ascertained by placing a given quantity between two horizontal conducting electrodes, with the upper electrode having a known area and known weight or effect on the mass of dust particles. By observing the current flow through the dust-mass and knowing the voltage drop across it, resistivity can be calculated.

In Figs. 10 and 11, a measuring apparatus for so ascertaining resistivity is shown. It comprises an insulating support 118 which horizontally supports an electrode-means 120 comprising a guard ring or flat metal frame 122 having a central opening in which a metal disc 124 of the same thickness fits with only sufficient clearance to receive a narrow insulating ring 125 which insulates the disc 124 from the frame 122. The sample dust particles 126 are placed on this electrode-means 120 in sufficient quantity to cover the disc 124 and part of the frame 122 some distance beyond the edges of the disc, as shown. An upper metal electrode-means 128 rests on the dust-sample 126, having a weight 130 for exerting (together with the electrode-means 128) a known pressure on the dust-sample.

An electric circuit is provided to send current through the dust-sample, comprising a direct-current voltage source 132 having one terminal connected by a conductor 134 to the upper electrode-means 128. Two branch circuits are provided from the other terminal of the voltage source, one branch comprising a conductor 136 connected between such terminal and the frame 122, and the other comprising conductor 138 connected between such other terminal and the disc 124 with a micro-ammeter 140 inserted for measuring the current. The guard-ring or frame 122 and the excess of dust-particles around the edges of the disc 124 are provided for eliminating edge effects. The current through the guard-ring will obviously not be measured by the micro-ammeter 140.

Fig. 9 illustrates the resistivity variation of a mixture of dust-particles which had been electrically precipitated in the preferred electrical dust-precipitator, as affected by temperature and humidity, the curve values being the average of a number of tests. The mixture tested comprised about one cubic inch of dust-particles subjected to a weight of about .85 pound including an upper electrode having an area of 4 square inches. The disc 124 had an area of 2.6 square inches and a 3-kilovolt direct-current voltage was applied across the top and bottom electrodes which were separated about ¼ inch. Prior to each test, the weight was twisted once or twice.

The particles, electrically precipitated in the electrical dust-precipitator 36, differed in resistivity characteristics, as measured by the described measuring apparatus, from the particles removed from the gas by the mechanical dust-collector 18. The electrically caught particles showed substantially no change in resistivity when the voltage across the two electrodes 120 and 128, for a fixed spacing, varied from about ⅓ to 3 kilovolts, whereas the mechanically caught particles decreased in resistivity with increased voltage by as much as 90% through this voltage range.

In a dust-precipitator having a substantially uniform main precipitating field, back-ionization can be minimized by keeping down the resistivity of the dust-particles, as a mass, as measured in accordance with the foregoing.

We have found that in order to limit back-ionization from the foraminous electrodes of the preferred electrical dust-precipitator, it is desirable to have the resistivity of the particles, measured in a mass as described, about $10^9$ ohms per cubic inch and lower. This means that the temperature in the portion of the flue-gas originally containing fly-ash, which portion is to be electrically cleaned, should be not much above 210° F. if the gas has a dew point of about 150–125° F. While the curves of Fig. 9 indicate that a utilizable resistivity can also be obtained at temperatures above about 550° F., such high temperatures introduce different operating conditions which should be considered.

In the system shown in Fig. 1, we utilize an $H_2O$ spray for controlling the temperature or humidity, or both, of the gas-portion flowing to the electrical dust-precipitator. One or more spray-nozzles 142 are disposed in the conduit section 26, the nozzles being connected to a water or steam supply pipe 144, and one or more spray-nozzles 146 are also disposed in the conduit-section 28, connected to a water supply pipe 148. Automatically controlled adjustable valves 150 and 152 are disposed in the supply pipes 144 and 148, respectively; the valve 150 being controlled in accordance with a factor which is responsive variably in accordance with the rate of fuel combustion in the boiler 2; and the valve 152 being controlled in accordance with a factor which is responsive variably in accordance with the temperature of the gas-portion flowing into the electrical dust-precipitator 36. However, in our preferred embodiment, the maximum amount of water or steam discharged into the gas-stream is never so much as to permit subsequent condensation. The spray is all evaporated into the gas, and an important advantage of our invention resides in the fact that there will be no later condensation when the gas-portion which leaves the electrical dust-precipitator, commingles with the main gas-portion for passage through the smokestack. This results because the main gas-portion passing through the mechanical dust-collector only is relatively hot and is so much greater in quantity than the electrically cleaned gas-portion that when the two gas-portions mix, the temperature of the mixture is much higher than that of the cooled gas-portion flowing in the by-pass for electrostatic cleaning. Water may increase the corrosive action of corrosive gases, such as for example sulphur oxides, in the flue-gas and form corrosive solutions, compounds or acids. By keeping the humidity down in the manner explained, such corrosive action is minimized.

Any suitable expedient may be used to control the valve 150 in some manner responsive to the rate of fuel combustion, and, consequently, flue-gas generation, so that the amount of water sprayed into the gas-portion in the by-pass will follow the amount of generated flue-gas, but not necessarily in the same proportion as the consumption of fuel. In boilers where steam is used for blowing soot from the boiler-tubes, the amount of spray injected under control of valve 150 should be lower because of the additional humidity in the flue-gas provided by such steam.

In the embodiment shown, the valve 150 is controlled by the position of the valve-vane 12 in the air-feed pipe 10 by providing a cam 154 movable in accordance with the position of the valve-vane 12. The cam 154 has a suitably formed cam groove 156 which controls a slider therein, in turn controlling a sending station 158 of any suitable telemetric system indicated in its entirety by the reference numeral 160, having a receiving station 162 which adjusts the valve 150 in accordance with the effect of the position of the cam 154 on the sending station. When the valve-vane 12 and the valve 150 are close to each other, the telemetric system may comprise any suitable linkage system.

In many instances, the flue-gas leaving the heat-exchanger 8 has sufficient water vapor so that the skimmed gas-portion can be electrically cleaned satisfactorily if its temperature only is considered. In such cases, the water-spray can be utilized primarily for temperature control, or some other cooling means provided. As an example of temperature control by evaporating a water-spray in the flue-gas, in an embodiment of our invention the addition of about 11 grains of water to each cubic foot of flue-gas at 320° F. lowered the temperature of the flue-gas to about 200° F. With original dewpoints of 130–150° F., such addition of water vapor to the flue-gas will increase its dewpoint by about 10–6° F.

In Fig. 1, a temperature responsive means 164, responsive to the temperature of the gas flowing into the electrical dust-precipitator 36, controls the valve 152 through any suitable control or telemetric system 166. For such a system the spray nozzles 142 and the control therefor can be omitted or the supply to such nozzles shut off at a throttle valve 168. A throttle valve 170 can be used to shut off the water supply to the spray-nozzles 146. However, the total spray can, if desired, be varied under control of both an operating condition of the boiler 2 and the temperature of the gas-portion in the by-passing conduit means including the header 24 and the electrical dust-precipitator 36; or one or the other of the spray nozzles can be omitted. For temperature control only of the gas to be electrically cleaned, any other suitable means may be provided which will either cool or heat the gas, depending on the portion of the curve of Fig. 9 chosen for operating conditions. Preferably, the temperature of this gas-portion should be outside a range of from about 210° to 550° F. in a system cleaning flue-gas having fly-ash. However, other gases carrying different dust-particles will have different characteristic curves of a type shown in Fig. 9, but in general, their resistivity should be such that the voltage-drop across a layer of them on a receiving-electrode should not be so great as to cause or sustain a discharging breakdown through the layer. Generally a resistivity below 5 times $10^9$ ohms per cubic inch is satisfactory.

While we have described our invention with respect to a preferred system including a novel electrical dust-precipitator and have recited in some detail data with respect thereto, it is obvious that the arrangements and structures are subject to wide variation and modification in adapting the general principles of our invention to various commercial installations. Consequently, the data recited are not to be considered as limitations of the general characteristics of our invention.

The gas-temperatures in the outlet 4 or conduit-section 26 are obviously dependent upon the particular operation of a particular plant, and the nature of the gas-borne dust-particles will vary widely in the combustion of different fuels or even the same fuel combusted under different circumstances; and many other variables may be adapted into the teachings of our invention.

We claim as our invention:

1. A gas-cleaning system for a plant discharging flue-gas, comprising a flue-gas conduit means including mechanical dust-collector means for cleaning a substantial prepondering portion of the flue-gas discharged from said plant, said flue-gas conduit means comprising means for concentrating the comparatively finer dust-particles in the flue gas, in a second portion of the flue-gas, which is appreciably smaller than said prepondering portion, said flue-gas conduit means comprising separate gas-passage means in which said second portion of said flue-gas is caused to flow, an electrical dust-precipitator in said separate gas-passage means for removing such finer dust-particles, means for affecting the temperature and humidity of said second portion of the flue-gas before it reaches said electrical dust-precipitator, said gas-cleaning system comprising means responsive to the volume of the discharged gas for controlling the last said temperature and humidity affecting means, said flue-gas conduit means comprising a smokestack for substantially all of said flue-gas.

2. A system for cleaning a flue-gas containing fly-ash, which comprises means for cleaning the flue-gas by removing relatively larger dust-particles therefrom and for increasing the concentration of the fine dust-particles of a size about 20 microns or less in a small portion of the flue-gas at the expense of the remaining portion, an electrical dust-precipitator, means for separating said small portion of the flue-gas and passing it through said electrical dust-precipitator for cleaning, means for recombining the electrically cleaned portion of the flue-gas with the said remaining portion of the flue-gas, and means, under control of the temperature of said small portion of the flue-gas, for injecting $H_2O$ therein before it enters said electrical dust-precipitator, the quantity of $H_2O$ injected being limited so as to completely vaporize but sufficient to reduce the resistivity, as a mass, of precipitated fine dust particles to about $5 \times 10^9$ ohms per cubic centimeter, or less.

3. A system for cleaning a hot dust-laden gas comprising a mechanical dust-collector for removing the relatively larger dust-particles from the gas, said dust-collector being of a type which whirls the gas for concentrating fine dust-particles of a size about 20 microns or less originally carried by the flue-gas in an outer portion of the gas, and provided with means for skimming off a fine-particle-laden outer layer of the gas, separate outlet means from said mechanical dust-collector for such outer layer of gas and for the remaining gas, an electrical dust-precipitator means, conduit means for passing said outer layer of the gas through said electrical dust-precipitator, means operable for controlling the temperature of said outer layer of said gas before it enters said electrical dust-precipitator means whereby to improve electrical precipitation of said fine dust-particles, a smokestack, and gas-passage means from the outlet means of said electrical dust-precipitator means and the outlet means for said remaining gas, said gas-passage means leading to the lower portion of said smokestack.

4. A method of removing fly-ash from moving gaseous products of combustion, which comprises: removing relatively larger dust-particles from the gaseous products of combustion; concentrating relatively fine fly-ash dust-particles of a size about 20 microns and less in a fraction constituting about one-sixth of the said gaseous products of combustion; controlling gaseous conditions of said fraction of the gaseous products of combustion so that its temperature is about that of the boiling point of water or below, and its humidity has a dew point less than its temperature, and thereafter electrostatically cleaning said fraction of the gaseous products of combustion while the said fraction of said gaseous products of combustion is in substantially the controlled gas-conditions aforesaid.

5. A method of removing dust-particles from gaseous products of combustion, comprising passing the gas through a heat-exchanger for cooling the gas to temperatures significantly above the boiling point of water; then mechanically treating all of the gas for removing relatively larger dust-particles and for concentrating relatively fine dust-particles in a portion of the gas; segregating such a portion of the gas; spraying $H_2O$ into such portion of the gas for reducing the resistivity of the fine dust-particles, as a mass, then electrostatically cleaning said portion of the gas, subsequently recombining said electrostatically cleaned portion of the gas with the hotter main gas-stream of the mechanically cleaned gas, and finally passing the recombined gas-stream through a smokestack, the said spraying being insufficient to cause condensation in the smokestack.

6. A method of cleaning flue-gas arising out of the combustion of bituminous coal, which comprises concentrating fine dust-particles of less than about 20 microns in a first portion of the gas at the expense of the remaining portion of the gas, electrostatically cleaning said first portion of the gas, and controlling the gas-conditions of said first portion of the gas so that precipitated dust-particles have a resistivity, as a mass, of less than 5 times $10^9$ ohms per inch cube, as measured in a limited volume between two flat electrodes spaced about ¼ inch, having about 3 kilovolts direct-current across the electrodes and exerting a pressure of about .21 pound per square inch on the mass.

7. A method of cleaning a gas comprising hot products of combustion containing fly-ash, which comprises treating substantially all of the gas for removing relatively larger dust-particles therefrom, concentrating relatively fine dust-particles of a size in the neighborhood of 20 microns and less in an appreciably minor part of the gas at the expense of the remaining part of the gas, controlling gas-conditions of said minor gas-part so that its temperature is about that of the boiling point of water and its humidity has a dew point of about 125°–150° F. but less than its temperature, and separately electrostatically cleaning said minor gas-part while its gas-conditions remain substantially as aforesaid.

8. A method of cleaning a gas comprising hot products of combustion containing fly-ash which comprises treating substantially all of the gas for removing relatively larger dust-particles therefrom, concentrating relatively fine dust-particles of a size in the neighborhood of 20 microns and less in an appreciably minor part of the gas at the expense of the remaining part of the gas, controlling gas-conditions of said minor gas-part so that its temperature is about that of the boiling point of water and its humidity has a dew point of about 125°–150° F. but less than its temperature, separately electrostatically cleaning said minor gas-part while its gas-conditions remain substantially as aforesaid, and, recombining said minor gas-part, after being electrostatically cleaned, with a quantity of remaining gas, with the temperatures and quantities of such remaining gas and minor gas-part being such that the general temperature of the recombined gas, substantially immediately after the gas-recombination, is above the boiling point of water.

9. A system of a class described for cleaning a flowing gas having relatively larger and smaller dust-particles, gas-conduit means for the gas-stream, said gas-conduit means including means for removing relatively larger dust-particles from the gas-stream and for concentrating the relatively smaller dust-particles in the gas-stream, of a size about 20 microns and less, in a minor part of about 16% of the gas-stream, means for continually skimming off such minor part of the gas-stream, said gas-conduit means comprising a by-pass passage for said skimmed-off minor part of the gas-stream, an electrical dust-precipitator in said by-pass passage, comprising a pair of receiving electrode-means on opposite sides of the gas-stream, and a field-establishing electrode-means transversely between said receiving electrode-means, said field-establishing electrode-means comprising an upstream group of ionizing-wire-means and a downstream electrode-means cooperating with said receiving electrode means, for providing electrostatic field-conditions which are upstream more intensely ionizing through the action of said ionizing wire-means than downstream through the action of said downstream electrode-means, said downstream electrode-means being longer in the direction for gas flow than said ionizing wire-means, said receiving electrode-means each comprising a relatively shallow pocket-type structure having a front provided with a plurality of distinct openings facing and substantially coextensive with said field-establishing electrode-means in the direction for gas-flow.

10. A system including that of claim 9 characterized by including a humidifying means for controlling the humidity of said skimmed-off minor gas-part, said humidifying means comprising means in said by-pass passage for discharging a limited completely-vaporizable quantity of $H_2O$ into said skimmed-off minor gas-part before it is electrically cleaned by said dust-precipitator, and said gas-conduit means having a common gas-passage means for all of the cleaned gas.

11. A system for cleaning a dust-laden gas, comprising gas conduit means including, in combination, a mechanical dust-collector means having concentric tubes for removing relatively larger dust-particles from substantially all of the gas, with finer dust-particles being centrifugally concentrated inside the smaller of said tubes in a minor fraction of the gas, such fraction whirling at a velocity above that at which it can be effectively electrostatically cleaned, gas-skimmer means for skimming off such whirling gas having such concentrated finer dust-particles, and distinct gas passage means for the skimmed off gas, said gas passage means including expansion means for reducing the velocity of the skimmed off gas for electrostatic cleaning, and an electrostatic dust-precipitator successively in the direction for gas flow, and draft-inducing means for said distinct gas-passage means, said electrostatic dust-precipitator comprising a pocket-type dust-collecting electrode.

12. A gas-cleaning system for cleaning a hot dust-laden gas flowing, at times, at velocities above that at which the gas can be effectively cleaned by an electrical dust-precipitator, said gas-cleaning system comprising gas conduit means including, in combination, a mechanical dust-collector means of the concentric tube type for removing relatively larger dust-particles from substantially all of the gas and concentrating finer dust-particles in the gas in a minor fraction thereof. gas-skimmer means associated with the inner of said tubes for skimming off said minor fraction of gas, distinct gas passage means from said gas-skimmer means, comprising a gas-cooling means, an expansion chamber and an electrical dust-precipitator arranged successively in the direction for gas flow.

13. A gas-cleaning system for cleaning a hot dust-laden gas flowing, at times, at velocities above that at which the gas can be effectively cleaned by an electrical dust-precipitator, said gas-cleaning system comprising gas conduit means including, in combination, a mechanical dust-collector means of the concentric tube type for removing relatively larger dust-particles from substantially all of the gas and concentrating finer dust-particles in the gas in a minor fraction thereof, gas-skimmer means associated with the inner of said tubes for skimming off said minor fraction of gas, distinct gas passage means from said gas-skimmer means, comprising an expansion chamber, an electrical dust-precipitator and a gas-propelling means arranged successively in the direction for gas flow, and gas-cooling means before said electrical dust-precipitator. said electrical dust-precipitator comprising a pocket-type dust-collecting electrode.

14. The system of claim 2 characterized by including an expansion chamber on the upstream side of said electrical dust-precipitator, and a gas-propelling means on the downstream side thereof.

15. The system of claim 3 characterized by said conduit means for said outer layer of gas including means for reducing the gas-velocity before the gas passes to the electrical dust-precipitator.

16. The method of claim 4 characterized by including the step of reducing the velocity of the portion of the gas containing the relatively fine dust-particles before it is electrostatically cleaned.

17. The method of claim 5 characterized by including the step of reducing the velocity of the portion of the gas containing the relatively fine dust-particles before it is electrostatically cleaned.

18. A system for removing and cleaning a hot gas, comprising gas-conduit means including, in combination, mechanical dust-collecting means for removing relatively larger dust-particles from the gas and for concentrating comparatively fine gas-borne dust-particles in a minor portion of the gas, said dust-collecting means including means for continuously skimming off such minor dust-laden portion of the gas; branch passage means for said minor portion of the gas, including an expansion chamber, an electrical dust-precipitator on the downstream side of said expansion chamber for removing fine dust-particles carried by said minor portion of the gas, and cooling means for cooling said minor portion of the gas before it enters said electrical dust-precipitator, whereby continuous electrical precipitation of the fine particles is improved; conduit means for remixing electrically cleaned gas and relatively hotter gas which has passed through said mechanical dust-collecting means but not through said electrical dust-precipitator, and for conveying the mixed gases; and control means responsive in some manner to the temperature of the expanded gas in said branch passage means for controlling said cooling means, whereby the gas treated by the electrical dust-precipitator is cooled to a temperature of about 210° F. or lower.

19. A system for removing and cleaning a hot gas, comprising gas-conduit means including, in combination, mechanical dust-collecting means for removing relatively larger dust-particles from the gas and for concentrating comparatively fine gas-borne dust-particles in a minor portion of the gas, said dust-collecting means including means for continuously skimming off such minor dust-laden portion of the gas; branch passage means for said minor portion of the gas, including an expansion chamber, an electrical dust-precipitator on the downstream side of said expansion chamber for removing fine dust-particles carried by said minor portion of the gas, and cooling means comprising means for discharging a water-spray into said minor portion of said gas, whereby continuous electrical precipitation of the fine particles is improved; conduit means for remixing electrically cleaned gas and relatively hotter gas which has passed through said mechanical dust-collecting means but not through said electrical dust-precipitator, and for conveying the mixed gases; and control means responsive in some manner to the total volume of said gas for maintaining said minor portion of said gas at a temperature below about 210° F., with a relatively high humidity but not so high as to cause significant condensation of moisture.

20. A gas-cleaning system for cleaning a hot gas heavily laden with dust, the gas flowing, at times, at velocities above that at which it can be effectively cleaned by an electrical dust-precipitator, said gas-cleaning system comprising gas conduit means including, in combination, a mechanical dust-collecting means of the concentric tube type for moving relatively larger dust-particles from substantially all of the gas and concentrating relatively finer dust-particles in the gas in a minor fraction thereof, gas skimmer means associated with the inner of said tubes for skimming off said minor fraction of gas, separate passage means for the remaining portion of said gas, distinct gas passage means from said gas-skimmer means, including expansion means for reducing the velocity of the gas flowing therein for electrostatic cleaning, means for introducing H₂O into gas flowing therein, an electrostatic dust-precipitator means on the downstream side of said velocity reducing means and said H₂O discharging means, and a draft inducing means, said distinct gas passage means having a conduit means extending between the outlet of said electrostatic dust-precipitator means and said separate passage means for recombining hot gas of said separate passage means with gas from the electrostatic dust-precipitator means in amounts such that the temperature of the combined gas is above its dew point.

GAYLORD W. PENNEY.
RUSSELL A. NIELSEN.